(12) United States Patent
Kneckt et al.

(10) Patent No.: US 10,849,168 B2
(45) Date of Patent: Nov. 24, 2020

(54) SINGLE USER MULTI-TID TXOP WITH QOS PRIORITIZATION

(71) Applicant: Apple Inc., Cupertino, CA (US)

(72) Inventors: Jarkko L. Kneckt, Los Gatos, CA (US); Oren Shani, Saratoga, CA (US); Christiaan A. Hartman, San Jose, CA (US); Joonsuk Kim, Saratoga, CA (US); Guoqing Li, Campbell, CA (US); Yong Liu, Campbell, CA (US); Ashok Ranganath, San Jose, CA (US)

(73) Assignee: Apple Inc., Cupertine, CA (US)

( * ) Notice: Subject to any disclaimer, the term of this patent is extended or adjusted under 35 U.S.C. 154(b) by 51 days.

(21) Appl. No.: 15/590,866

(22) Filed: May 9, 2017

(65) Prior Publication Data

US 2017/0332414 A1    Nov. 16, 2017

Related U.S. Application Data

(60) Provisional application No. 62/334,212, filed on May 10, 2016.

(51) Int. Cl.
| | |
|---|---|
| *H04W 74/08* | (2009.01) |
| *H04L 12/807* | (2013.01) |
| *H04W 28/02* | (2009.01) |
| *H04L 12/851* | (2013.01) |

(52) U.S. Cl.
CPC ..... *H04W 74/0875* (2013.01); *H04L 47/2441* (2013.01); *H04L 47/27* (2013.01); *H04W 28/0268* (2013.01)

(58) Field of Classification Search
CPC .......... H04W 74/0875; H04W 28/0268; H04L 47/2441; H04L 47/27
IPC .................................................. H04W 74/0875
See application file for complete search history.

(56) References Cited

U.S. PATENT DOCUMENTS

| | | | |
|---|---|---|---|
| 2006/0018332 A1* | 1/2006 | Kakani | H04L 1/1614 370/428 |
| 2006/0083233 A1* | 4/2006 | Nishibayashi | H04L 1/1621 370/389 |
| 2007/0104162 A1* | 5/2007 | Kneckt | H04L 47/564 370/338 |
| 2011/0150004 A1* | 6/2011 | Denteneer | H04L 5/0023 370/476 |
| 2011/0255618 A1* | 10/2011 | Zhu | H04B 7/0413 375/260 |
| 2012/0218947 A1* | 8/2012 | Merlin | H04L 25/03343 370/329 |
| 2013/0128733 A1* | 5/2013 | Lee | H04W 74/02 370/230 |

(Continued)

Primary Examiner — Ivan O Latorre
(74) Attorney, Agent, or Firm — Sterne, Kessler, Goldstein & Fox P.L.L.C.

(57) ABSTRACT

Disclosed herein are method, system, and computer program product embodiments for utilizing multiple traffic identifiers (TIDs) in a single user (SU) transmission. Some embodiments may operate by forming a SU multiple TID data unit that includes first data associated with a first access category and a first TID and second data associated with a second access category and a second TID. Some embodiments may further operate by transmitting the SU multiple TID data unit during a transmission opportunity based on configuration parameters associated with the transmission opportunity.

16 Claims, 7 Drawing Sheets

(56) References Cited

U.S. PATENT DOCUMENTS

| | | | |
|---|---|---|---|
| 2013/0301569 A1* | 11/2013 | Wang | H04L 5/0055 370/329 |
| 2014/0119178 A1* | 5/2014 | Zhao | H04W 28/0268 370/230 |
| 2016/0014804 A1* | 1/2016 | Merlin | H04L 5/0044 370/329 |
| 2016/0234726 A1* | 8/2016 | Nuggehalli | H04W 36/0022 |
| 2017/0006494 A1* | 1/2017 | Wang | H04W 8/005 |
| 2017/0134138 A1* | 5/2017 | Madhavan | H04L 5/0055 |
| 2018/0295627 A1* | 10/2018 | Li | H04L 1/1614 |

* cited by examiner

SINGLE USER MULTI-TID TXOP WITH QOS PRIORITIZATION

CROSS-REFERENCE TO RELATED APPLICATION

This application claims the benefit of U.S. Provisional Application No. 62/334,212, titled "Single User Multi-TID TXOP with QoS Prioritization," filed on May 10, 2016, which is incorporated by reference in its entirety.

BACKGROUND

Technical Field

The described embodiments relate to techniques for communicating information among electronic devices within a wireless communication system, including communication techniques for utilizing multiple traffic identifiers (TIDs) within a single user (SU) transmission.

Background

SU transmissions involve transmitting a data unit, such as a media access control (MAC) protocol data unit (MPDU), between an access point and a single station. In an SU transmission, the access point's streams of data are directed to the single station. In contrast, multiple user (MU) transmissions allow an access point to divide its streams between different stations. For example, if an access point is capable of transmitting three streams of data, the access point may dedicate each stream to three separate stations in networks where MU transmissions are enabled.

In a network where only SU transmissions are enabled, stations contend for transmission opportunities (TXOPs) based on the type of data that is to be transmitted. A data unit in SU transmissions may be assigned a single TID associated with an access category (AC). A station that is granted a TXOP may transmit the data unit or may aggregate data units associated with the same AC to obtain the TXOP. When data units are aggregated, such as in an aggregated MDPU (A-MPDU), the aggregated data unit is a collection of MPDUs having the same TID associated with the AC used to obtain the TXOP. In other words, SU transmissions limit stations to transmitting data units associated with a single AC.

SUMMARY

For an SU transmission, a station communicates with an access point by, for example, transmitting an aggregated data unit having data units associated with a single TID within a TXOP. Unlike MU transmissions, SU transmissions lack the improvements in transmission efficiency and to power consumption that are afforded by utilizing multiple TID data units.

Provided herein are systems, methods, and computer program products for utilizing multiple traffic identifiers (TIDs) within a single user (SU) transmission. According to some embodiments, a method for transmitting an aggregated data unit that includes data associated with multiple traffic identifiers is provided. According to the method, traffic identifiers are mapped to different access categories that correspond to the data in the aggregated data unit. According to some embodiments, a device for transmitting the aggregated data unit that includes data associated with multiple traffic identifiers is also provided.

Some embodiments relate to a method for transmitting an SU transmission including multiple TIDs. The method may include forming an aggregated data unit based on first data and second data. The aggregated data unit may include a parameter indicating that the aggregated data unit is a single-user multiple traffic identifier data unit. The method may further include contending for a transmission opportunity to transmit the first data that is associated with a first access category and the second data that is associated with a second access category. The method may further include associating the first data with a first traffic identifier based at least in part on the first access category and associating the second data with a second traffic identifier based at least in part on the second access category.

Some embodiments relate to a system for transmitting an SU transmission including multiple TIDs. The system may include a memory and a processor. The processor may be configured to perform operations including contending for a transmission opportunity to transmit data associated with an access category and associating the data with a traffic identifier based at least in part on the access category. The operations may further include obtaining the transmission opportunity based at least in part on the first access category and forming an aggregated data unit based at least in part on the first data, where the aggregated data unit includes a parameter indicating that the aggregated data unit is a single-user multiple traffic identifier data unit.

Some embodiments relate to a non-transitory computer-readable device having instructions stored thereon that, when executed by at least one computing device, causes the at least one computing device to perform operations including transmitting an SU transmission including multiple TIDs. The operations may include forming an aggregated data unit based at least in part on first data and second data. The aggregated data unit may include a parameter indicating that the aggregated data unit is a single-user multiple traffic identifier data unit. The operations may further include contending for a transmission opportunity to transmit the first data that is associated with a first access category and the second data that is associated with a second access category. The operations may further include associating the first data with a first traffic identifier based at least in part on the first access category and associating the second data with a second traffic identifier based at least in part on the second access category. The operations may further include determining, based at least in part on an aggregation rule, whether to send the aggregated data unit as a single-user multiple traffic identifier data unit and adding a parameter to the aggregated data unit in response to this determination. The parameter indicates that the aggregated data unit is a single-user multiple traffic identifier data unit. The operations may further include transmitting the aggregated data unit based at least in part on the aggregation rule and the transmission opportunity.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
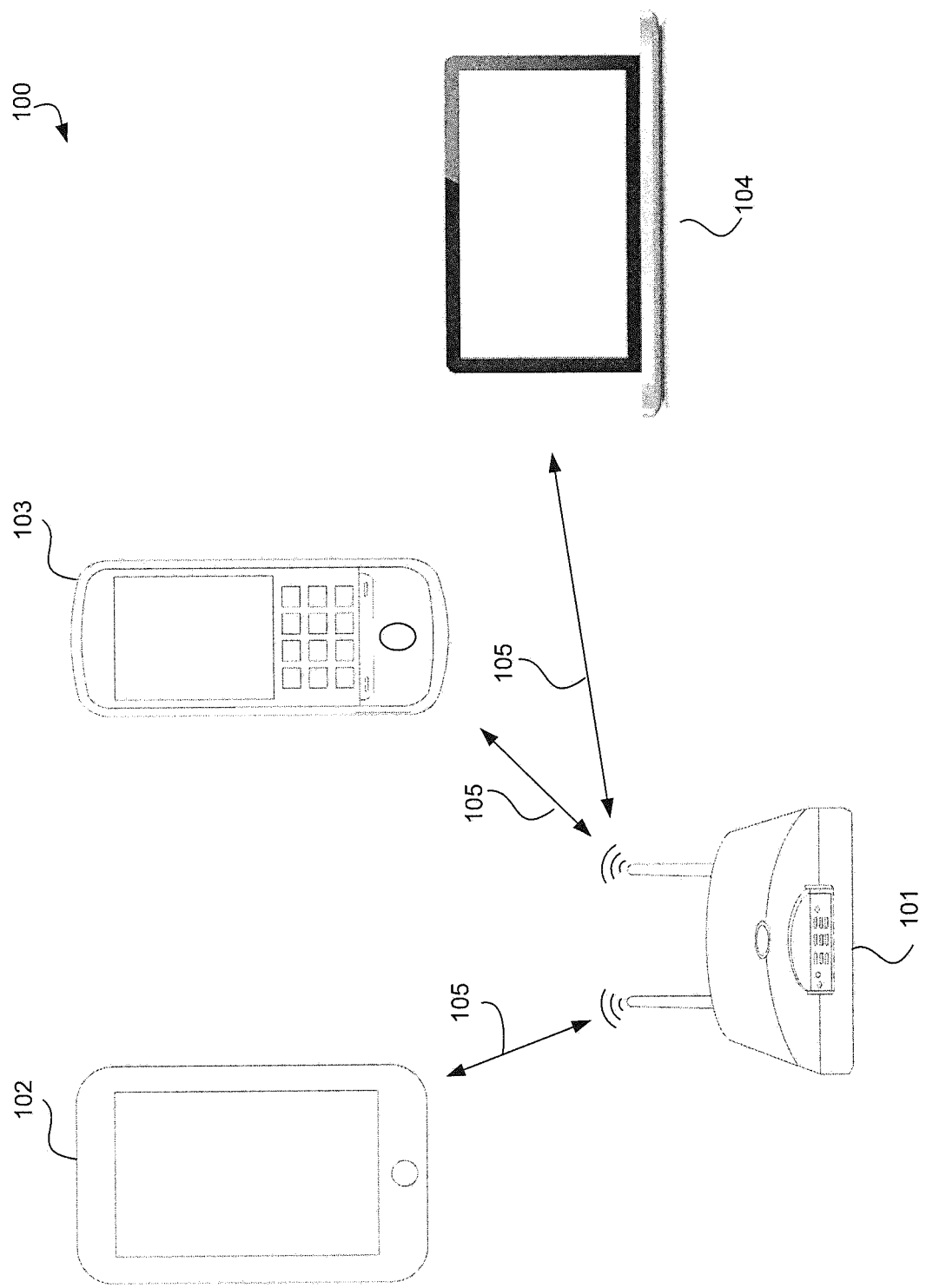
FIG. 1 is a block diagram of an example system implementing single-user multiple traffic identifier transmissions with quality of service prioritization, according to some embodiments.

FIG. 1 is a block diagram of an example system implementing single-user multiple traffic identifier transmissions with quality of service prioritization, according to some embodiments. System 100 includes an access point 101 in communication with electronic devices (also called "stations") 102-104. Electronic devices 102-104 may be implemented as, but are not limited to, set-top boxes, remote controls, game controllers, cellular phones, smart phones, wearable devices, tablets, personal digital assistants (PDAs), laptops' and/or desktop computers. For example, in some embodiments, electronic device 102 may be implemented as a tablet, electronic device 103 may be implemented as a smart phone, and electronic device 104 may be implemented as a laptop. Other configurations of system 100 that include differing numbers of access points and electronic devices are possible and within the scope of the disclosure. In some embodiments, access point 101 supports multiple input, multiple output (MIMO) technology and is capable of transmitting and receiving single-user (SU) transmissions. In some embodiments, one or more electronic devices 102-104 support MIMO technology and are capable of transmitting and receiving SU transmissions. Electronic devices that do not support MIMO technology (also referred to herein as "legacy" stations) may also be implemented within system 100.

Connections 105 allow for data transmissions between access point 101 and electronic devices 102-104. According to some embodiments, connections 105 may be the same or different, and each connection 105 may include but are not limited to a wireless local network connection (such as but not limited to connections that comply with the Institute of Electrical and Electronics Engineers (IEEE) 802.11 standard, which is sometimes referred to as Wi-Fi). Although not illustrated, connections 105 may include intermediary networking devices, such as access points, that may facilitate communications between access point 101 and electronic devices 102-104.

Although not illustrated, electronic devices 102-104 may communicate directly with each other (e.g., by bypassing access point 101). In some embodiments, electronic devices 102 utilize a direct link setup in a network employing a direct link standard such as, for example, independent basis service set (IBSS), near-me area network (NAN), and Wi-Fi Direct or in a network employing a mesh networking topology. Additionally, in some embodiments, single-user multiple traffic identifier transmissions may be used in any network that utilizes enhanced distributed channel access (EDCA).

In some embodiments, electronic device 102 and electronic device 103 may have different categories of data to communicate through access point 101. Examples of these categories include an access category for best-effort traffic, an access category for voice traffic, an access category for video traffic, and an access category for background traffic. For example, electronic device 102 may have voice data related to a voice-over-Internet Protocol (VOIP) call and best effort data related to an Internet Protocol (IP) browsing session. Electronic device 103 may have best effort data related to its own IP browsing session. In some embodiments, an access category may be associated with one or more transmission parameters such as an Arbitration Inter Frame Spacing (AIFS) value, a minimum contention window value (CWmin), and a maximum contention window value (CWmax). Different priorities may be given to each access category based on the one or more of the transmission parameters.

In some embodiments, access categories may be associated with different traffic identifiers (TIDs), and each access category may have more than one associated TID. For example, the background traffic access category may be associated with TID 0 and TID 1, the best-effort access category may be associated with TID 2 and TID 3, the video access category may be associated with TID 4 and TID 5, and the voice access category may be associated with TID 6 and TID 7. Similarly, MAC-level management frames may be transmitted in TID 7 or a management frame type specific TID may be used for the management frame. Each TID may be used to select a transmission priority or quality of service (QoS) for data packets. In some embodiments, a TID with a higher value may have a higher transmission priority than a TID with a lower value.

In some embodiments, when electronic devices 102 and 103 are ready to transmit their respective data, they may contend for a TXOP through which the winning device may transmit its data to access point 101. Because access point 101 grants the TXOP based on a single access category and electronic device 102 has voice data (e.g., having a voice access category) and IP data (e.g., having a best effort access category), electronic device 102 selects data from either the voice access category or the best effort access category for which to contend for the TXOP. For example, electronic device 102 may select the voice access category to contend for the TXOP, while electronic device 103, which only has best effort data to transmit, selects the best effort category to contend for the TXOP.

According to some embodiments, when access point 101 grants the TXOP to an electronic device, the access category used by the electronic device to contend for the TXOP may be considered a primary access category for the granted TXOP. Access point 101 may define a maximum transmission period for the TXOP (TXOP limit) based on the primary access category, according to some embodiments. The TXOP limit represents the maximum transmission period during which an electronic device may transmit data.

If the electronic device has data for additional access categories, the additional access categories may be considered secondary access categories during the granted TXOP. For example, if access point 101 grants the TXOP to electronic device 102 based on the voice access category, the voice access category may be considered the primary access category during the TXOP while the best effort access category may be considered a secondary access category during the TXOP. When granted the TXOP, electronic device 102 may transmit one or more data units associated with the primary access category and may be allowed to transmit one or more data units associated with the secondary access category for the duration of the TXOP. In some embodiments, electronic device 102 may aggregate one or more data units of the primary access category and one or more data units of the secondary access category to form a single-user (SU) aggregated data frame. Examples of SU data units may include but are not limited to a media access control (MAC) protocol data unit (MPDU) and a physical layer conformance procedure (PLCP) protocol data unit (PPDU). Examples of SU aggregated data frames may include but are not limited to an aggregated MPDU (A-MPDU) and an aggregated PPDU (A-PPDU). A PPDU may encapsulate the A-MPDU and a physical header.

Electronic device 102 may transmit an A-MPDU that includes one or more data units associated with a voice access category and one or more data units associated with a best effort access category during the TXOP granted by access point 101. As discussed above, each data unit in the A-MPDU may have a TID that is associated with its specific access category. In response to receiving the A-MPDU, access point 101 may transmit a multiple-TID block acknowledgement to electronic device 102 to acknowledge receipt of the data units based on their respective TIDs.

An SU data frame may be distinguished from a multi-user (MU) data frame based on their formatting and the type of communications within system 100. For example, an SU data frame may be used for SU multiple-input multiple output (MIMO) communications between access point 101 and one of electronic devices 102-104 during a communication session. Conversely, an MU data frame may be used for MU MIMO communications between access point 101 and at least one electronic devices 102-104 during a communication session. In some embodiments, an SU data frame may contain information in a preamble or header that indicates that the data frame is an SU data frame. Similarly, in some embodiments, an MU data frame may contain information in a preamble or header that indicates that the data frame is an MU data frame.

Figure 2:
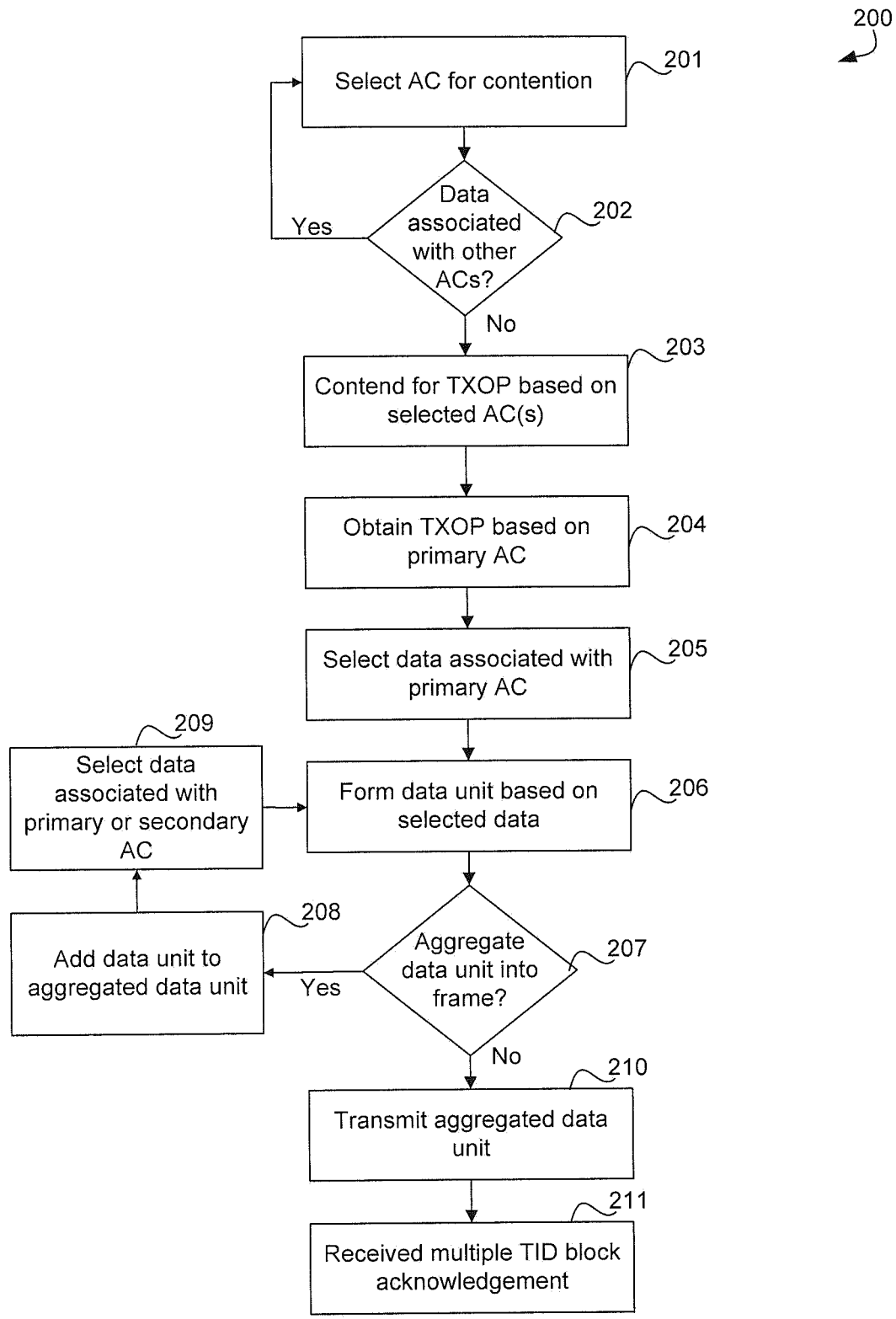
FIG. 2 is a flowchart illustrating an example method for transmitting a single-user aggregated frame having data with multiple traffic identifiers, according to some embodiments.

FIG. 2 is a flowchart illustrating an example method 200 for transmitting a single-user (SU) frame having data with multiple traffic identifiers, according to some embodiments. Method 200 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 2, as will be understood by a person of ordinary skill in the art. Method 200 will be described with reference to FIG. 1. For example, method 200 may be executed by any of electronic devices 102-104. However, method 200 is not limited to that example embodiment.

In 201, electronic device 102 selects an access category (AC) to contend for a TXOP when electronic device 102 has data to transmit over a communication medium (e.g., a channel) to access point 101. In 202, if electronic device 102 has data associated with additional access categories, electronic device 102 may select these additional access categories to contend for the TXOP. Accordingly, in some embodiments, electronic device 102 may compete for the communication medium using different access categories in parallel.

In 203, electronic device 102 may compete with electronic device 103 and electronic device 104 to obtain the TXOP from access point 101. Electronic device 102 may contend for the TXOP based on any ACs as selected in 201 and 202.

In 204, electronic device 102 obtains access to the communication medium for an access category and is awarded the TXOP. The access category utilized to obtain the TXOP is considered a primary access category. As discussed above, in some embodiments, a TXOP limit (e.g., a transmission duration of the TXOP) may be controlled by access point 101 based on the primary access category (e.g., access category used to obtain the TXOP). Access point 101 may also control EDCA parameters and SU configuration parameters associated with the TXOP. In some embodiments, access point 101 may include EDCA parameters and/or SU configuration parameters in beacon, probe response, and/or association response frames that are transmitted to electronic devices 102-104.

In some embodiments, the EDCA parameters may control to what extent electronic devices 102-104 can participate in single-TID SU transmissions while the SU configuration parameters may control operations of the SU multiple-TID transmission functions of electronic devices 102-104. Examples of SU configuration parameters include but are not limited to: (i) parameters for controlling whether SU multiple-TID transmissions are enabled/disabled; (ii) parameters for controlling whether an access category may be allowed to be a primary or secondary access category (iii) parameters determining the allowed combinations of primary and secondary access categories; (iv) parameters regarding the maximum secondary access category transmission time for each access category; (v) parameters specifying the maximum number of secondary access categories that may be included in a transmission; (vi) parameters defining the total maximum transmission time for a transmission including both primary and secondary access categories; (vii) parameters specifying a predetermined order of transmission for each secondary access category when aggregated in an aggregated data frame with a primary access category, and (viii) parameters regarding to what extent electronic devices (e.g., electronic devices 102-104) may participate in SU multiple-TID transmissions. Electronic devices 102-104 may adjust their transmissions based on the parameters provided by access point 101. Accordingly, access point 101 may dynamically adjust transmission behavior within system 100 by adjusting values of the EDCA and SU configuration parameters.

In some embodiments, electronic devices 102-104 may select the transmission bandwidth and the number of spatial streams through which data is transmitted. For example, when electronic device 102 obtains the TXOP for a first access category, the TXOP duration may be based on a TXOP limit associated with the first access category.

In 205-209, electronic device 102 constructs the single-user (SU) frame having data associated with multiple traffic identifiers. In 205, electronic device 102 may select data to be included an aggregated data unit or frame. Electronic device 102 may first select data associated with the access category that won the TXOP, which is identified as the primary access category as discussed above. In 206, electronic device 102 may form a data unit, such as a MPDU, including the data associated with the primary access category.

In 207, electronic device 102 determines whether to include the formed data unit into an aggregated data unit or frame, such as an A-MPDU. If so, in 208, electronic device 102 adds the formed data unit into the aggregated data unit. In 209, if there is additional data to be transmitted, electronic device 102 may select the additional data to form another data unit. In some embodiments, electronic device 102 may include at least one MPDU having data associated with the primary access category during the TXOP. Subsequently, other MPDUs having data associated with other access categories may also be transmitted during the TXOP. Accordingly, because electronic device 102 has already formed a data unit having data associated with the primary access category, electronic device 102 may subsequently select data from either the primary access category or a secondary access category or categories (if available) when forming additional data units. In some embodiments, there may be data associated only with the primary access category or associated with one or more secondary access categories. Electronic device 102 may then repeat 206 and 207 until all data has been selected for transmission and/or included in the aggregated data frame.

In 210, electronic device 102 transmits the aggregated data frame containing the data units having data associated with the primary access category and the secondary access category or categories. In some embodiments, data associated with the primary access category may have a first TID, and data associated with the secondary access category may have a second TID. Accordingly, an aggregated data unit may contain data associated with multiple access categories and multiple TIDs. As a result of method 200, electronic device 102 aggregates the data units containing first and second AC data into an A-MPDU. Therefore, the A-MPDU contains frames associated with multiple-TIDs.

In 211, electronic device 102 receives a block acknowledgement for data units in the aggregated data unit. The type of block acknowledgement depends on the settings of the network. For example, in some embodiments, the block acknowledgement may be a multiple TID block acknowledgement acknowledging all data units in the aggregated data unit. Alternatively, in some embodiments, the block acknowledgment may be a compressed block acknowledgement that acknowledges some or all of the transmitted MPDUs. Other types of block acknowledgements are within the scope of the disclosure. The block acknowledgement may be transmitted by access point 101. In response to receiving the aggregated data unit having multiple TIDs, access point 101 may transmit a single multiple-TID block acknowledgement (BA) rather than separate acknowledgements for each data unit, according to some embodiments.

Figure 3:
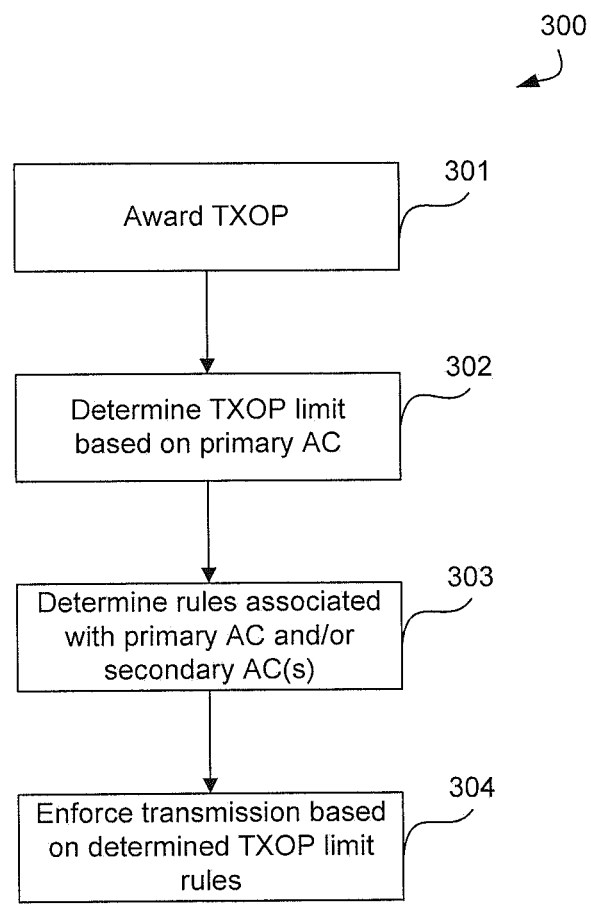
FIG. 3 is a flowchart illustrating an example method for enforcing transmission rules associated with a primary access category, according to some embodiments.

FIG. 3 is a flowchart illustrating an example process for enforcing transmission rules associated with a primary access category, according to some embodiments. Method 300 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 3, as will be understood by a person of ordinary skill in the art. Method 300 will be described with reference to FIG. 1. For example, method 300 may be executed by access point 101. However, method 300 is not limited to that example embodiment.

In 301, access point 101 may award a TXOP to an electronic device. In 302, access point 101 may determine a TXOP limit based on a primary access category. In some embodiments, access point 101 may additionally determine EDCA and SU configuration parameters associated with the TXOP. Access point 101 may include EDCA parameters and/or SU configuration parameters in beacon, probe response, and/or association response frames that are transmitted to electronic devices 102-104.

In 303, access point 101 may determine whether any aggregation rules are associated with the primary access category and/or secondary access categories (if any) and enforce determined aggregation rules for the TXOP. In some embodiments, aggregation rules allow access point 101 to control how electronic devices 102-104 aggregate and transmit data from different access categories to maintain efficiency and fairness of the SU multiple-TID transmissions within system 100.

Aggregation rules may enable SU multiple-TID transmission functionality within system 100 while reconciling this functionality with legacy standards (e.g., multiple-TID MU transmissions and single-TID SU transmissions). For example, legacy devices that are not capable of SU multiple-TID transmissions may be implemented in system 100. Aggregation rules ensure fairness between devices that are capable of SU multiple-TID transmissions and such legacy devices.

One example of an aggregation rule may require access point 101 to control which primary access categories can be include secondary access categories. In some embodiments, access point 101 may restrict certain primary access categories from including data from secondary access categories. For example, a rule may specify that the video access category is restricted from including data from other access categories. If electronic device 102 obtains a TXOP based on data associated with the video access category, access point 101 may restrict electronic device 102 to transmitting an aggregated data unit only having data units from the video access category and prevent transmission of any aggregated data units data from any other access category (e.g., best-effort and voice). The aggregation rule may also allow, in some embodiments, access point 101 to dynamically adjust which primary access categories may include secondary access categories during single transmissions on a variety of network factors including network conditions and traffic information. For example, the rule may allow TXOPs for data associated with best-effort or background ACs to include data from other ACs (e.g., voice or video) when the network is highly congested (e.g., based on metrics associated with packet loss, throughput, and/or latency).

In some embodiments, access point 101 may enforce the aggregation rule by use of the SU configuration parameter discussed above. For example, access point 101 may transmit a message containing an SU configuration parameter indicating whether an access category is allowed to have secondary access categories.

Another example of an aggregation rule may require access point 101 to control whether access categories can be classified as secondary access categories. Such a rule may require access point 101 to control whether an access category may be classified as a secondary access category for multiple TID SU transmissions. In some embodiments, access point 101 may configure a secondary access category TXOP limit parameter for an access category. The secondary access category TXOP limit parameter may define a maximum time in which data units with data associated with a secondary access category may be transmitted by electronic devices. For example, if the secondary access category TXOP limit parameter for the best-effort access category is set to zero, electronic devices will not be able to transmit data associated with the best-effort access category when it is classified as a secondary access category. In some embodiments, access point 101 may enforce this rule by use of the SU configuration parameter discussed above. For example, access point 101 may transmit a message containing an SU configuration parameter indicating the secondary access category TXOP limit value to electronic devices 102-104.

Another example of an aggregation rule may specify network conditions when access point 101 may enable SU multiple-TID transmissions. For example, one condition may first require access point 101 to detect a failure of at least one multiple-TID MU transmission (e.g., multiple-TID A-MPDU) prior to allowing electronic devices 102-104 to transmit an SU multiple-TID transmission. Access point 101 may allow an electronic device to retry the failed multiple-TID MU transmission as a SU multiple-TID transmission. This rule can simplify processing of aggregated data units because data units do not need to be reassembled into a different aggregated data unit. Another example of an aggregation rule may be to restrict SU multiple-TID transmissions to an 802.11ax MU PPDU format. In other words, by incorporating an SU multiple-TID aggregated data unit within a PPDU, the PPDU may be allocated to a single station.

Another example of an aggregation rule may allow access point 101 to process SU multiple-TID transmissions separately and differently than multiple-TID MU transmissions based on defined relationships between access categories. In one example, access point 101 may allow data associated with higher priority access categories to be transmitted within a TXOP granted to a lower priority access category. Conversely, access point 101 may allow lower priority access categories to be transmitted within a TXOP granted to a higher priority category. In yet another example, access point 101 may statically define fixed combinations of access categories that may be transmitted together within a TXOP (e.g., voice access category data may be transmitted as a secondary access category when the TXOP has been granted to background or best-effort access category data).

In 304, access point 101 enforces transmission during the TXOP based on the determined TXOP limit and aggregation rules. In some embodiments, enforcement of the determined TXOP limit is linked to enforcement of the aggregation rules. For example, if an aggregation rule contains secondary access category TXOP limit parameters for the access categories, access point 101 may determine the TXOP limit based on these parameters. As described above, the TXOP is bounded by the value of the TXOP limit which is determined based on the access category used to obtain the TXOP. The duration of transmissions of data units associated with the primary access category and secondary category or categories (if allowed) can be bounded by the TXOP limit.

Accordingly, access point 101 may enforce aggregation rules related to secondary access categories and primary access categories. In some embodiments, the primary access category does not have any limitations on its transmission duration while each secondary access category that is allowed to transmit may have a specific transmission limit (e.g., as defined by the secondary access category TXOP limit parameter) in which it may transmit within the TXOP. That is, access point 101 may limit the duration of transmitted data units for the secondary access category within the TXOP to a specific transmission limit assigned to that secondary access category. If there is more than one secondary access category, each secondary access category may have a separately calculated transmission limit.

In some embodiments, access point 101 may configure parameters in order to enforce the aggregation rules and to control transmissions within system 100. For example, access point 101 may dynamically adapt behavior of the transmissions within system 100 based on network factors, including the number of other stations in the network, the number of neighboring network(s) (e.g., as indicated by beacon messages), and the number of legacy stations (e.g., stations that do not support SU or MU multi-TID transmissions) in the network. Based on the network factors, access point 101 may be configured to execute a configuration change algorithm to adapt the behavior of the network. In some embodiments, if access point 101 detects a certain number of legacy stations in system 100, access point 101 may implement a variety of different configurations to minimize the impact to the legacy stations. For example, access point 101 may configure an SU configuration parameter to disable multi-TID transmissions (e.g., SU, MU, or both), may reduce the number access categories that can serve as secondary access categories, and/or may reduce the secondary access category TXOP limit parameter (e.g., reduces the transmission time in which secondary access category data may be transmitted).

Figure 4:
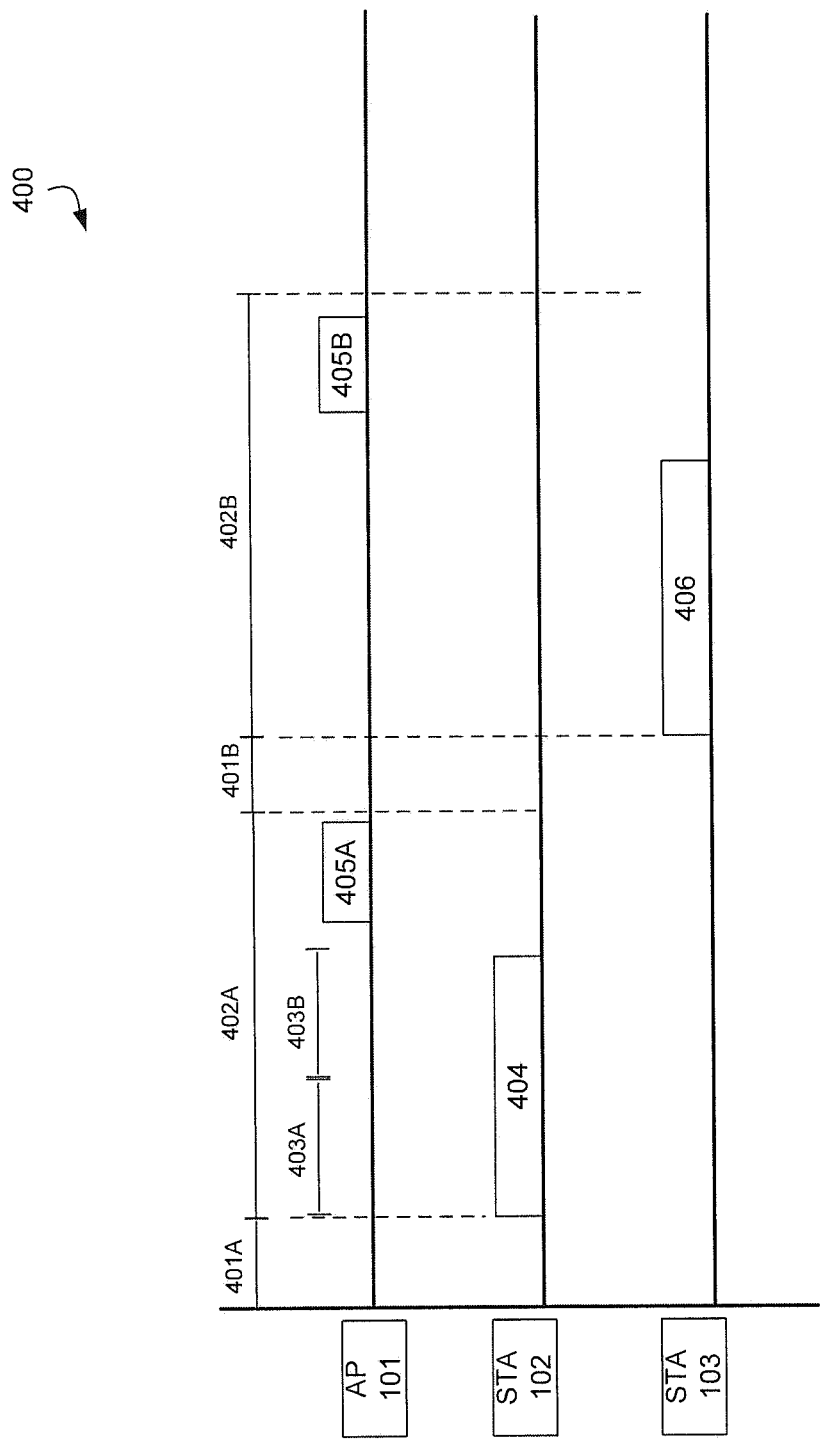
FIG. 4 is a transmission diagram illustrating example single-user multiple traffic identifier transmissions between an access point and two electronic devices, according to some embodiments.

FIG. 4 is a transmission diagram 400 illustrating example single-user multiple traffic identifier transmissions between access point 101 and electronic devices 102 and 103, according to some embodiments. However, transmission diagram 400 is not limited to this example embodiment. After electronic device 102 obtains a channel for communicating with access point 101 ("AP 101"), there is a back-off period 401A prior to when electronic device 102 may begin transmitting data. The duration of back-off period 401 may be based on the primary access category of the data to be transmitted (and for which access point 101 granted the TXOP to electronic device 102). The value of TXOP limit 402A may also be based on the primary access category. After back-off period 401A, electronic device 102 ("STA 102") then transmit a data unit 404 during TXOP limit 402A. In some embodiments, data unit 404 is an aggregated data unit (e.g., A-MPDU or A-PPDU) that contains data units associated with at least the primary access category. In some embodiments, data unit 404 contains data units associated with the primary access category and at least one secondary access category. In some embodiments, transmission of data unit 404 may be constrained by a transmission duration associated with the primary access category 403A and a transmission duration associated with the at least one secondary access category 403B.

In some embodiments, access point 101 may restrict data unit 404 to include data associated with the primary access category based on aggregation rules associated with the primary access category and/or secondary access categories discussed above. For example, an aggregation rule may specify that the primary access category is not allowed to be transmitted with data associated with a secondary access category. As another example, an aggregation rule may specify that data associated with certain access categories cannot be implemented as secondary access categories.

Access point 101 may then transmit a multiple-TID block acknowledgement 405A, which acknowledges the receipt of data associated with the primary and secondary access categories. After completion of TXOP limit 402A, electronic device 103 ("STA 103") obtains the channel and is granted a TXOP limit 402B. After a back-off period 401B, electronic device 103 may transmit a data unit 406. Similar to the description above with respect to data unit 404, electronic device 103 may be limited in its transmissions by aggregation rules implemented by access point 101. Access point 101 may then transmit a multiple-TID block acknowledgement 405B, which acknowledges the receipt of data associated with the primary and secondary access categories.

Figure 5:
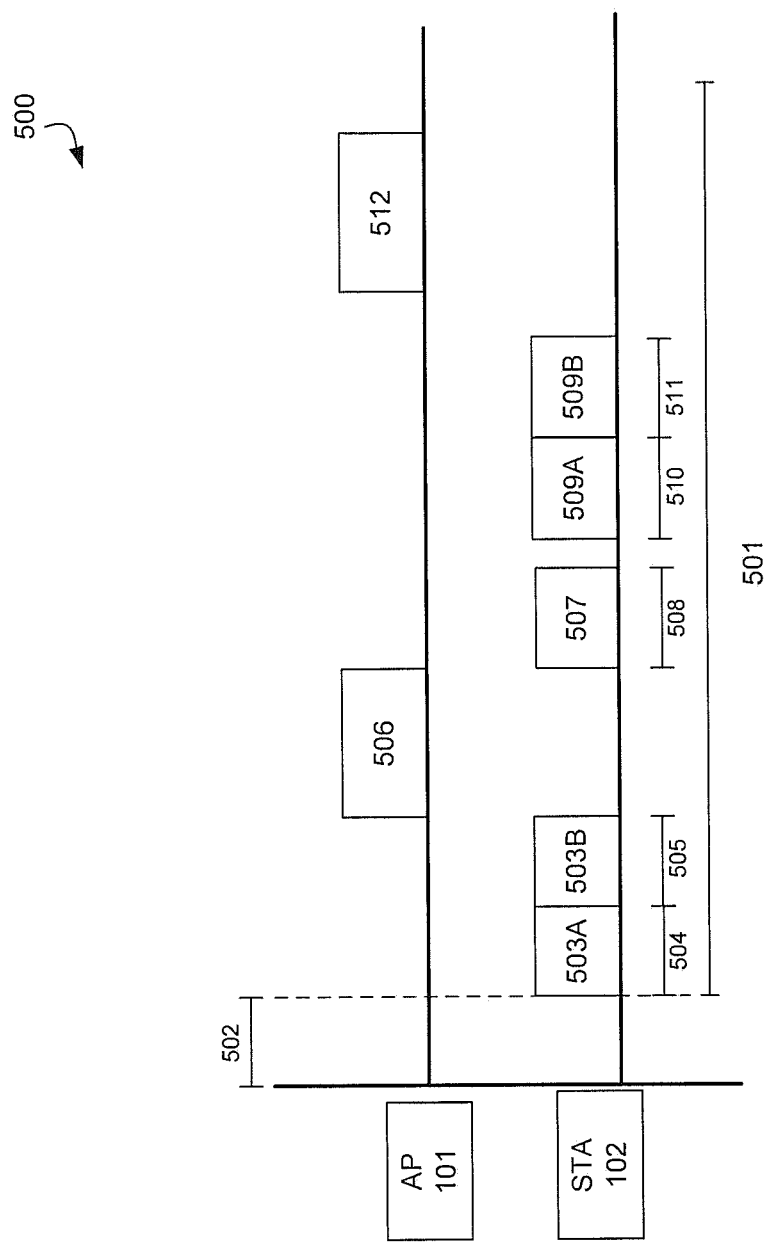
FIG. 5 is a transmission diagram illustrating example single-user multiple traffic identifier transmissions between an access point and one electronic device, according to some embodiments.

FIG. 5 is a transmission diagram illustrating example single-user multiple traffic identifier transmissions between access point 101 and electronic device 102 having data associated with at least two access categories, according to some embodiments. After obtaining a TXOP 501, electronic device 102 waits a back-off period 502 prior to transmitting a data unit 503. In some embodiments, data unit 503 is a PPDU containing a first data unit, 503A, such as an MPDU, having data associated with the primary access category and a second data unit 503B, such as an MPDU, having data associated with a secondary access category. MPDU 503A may have a transmission duration 504 based on the primary access category. MPDU 503B may have a transmission duration 505 associated with a secondary access category. Access point 101 may then transmit a multiple-TID block acknowledgement 506 which acknowledges the receipt of data associated with the primary and secondary access categories.

In some embodiments, access point 101 may enforce an aggregation rule that requires the first transmitted data unit to contain a data unit having data associated with the primary access category to ensure that at least one data unit from the primary access category is transmitted in case of communication or channel failure. Accordingly, after transmission of data unit 503 having data associated with the primary access category, electronic device 102 may then transmit data units 507 and 509, which have data associated with secondary access categories. Data unit 507 may be a PPDU containing a data unit having data associated with a secondary access category and having a transmission duration 508 based on the secondary access category. Data unit 509 may be a PPDU containing a first data unit, 509A, such as an MPDU, having data associated with a first secondary access category and a second data unit 509B, such as an MPDU, having data associated with a second secondary access category. MPDU 509A may have a transmission duration 510 based on the first secondary access category. MPDU 509B may have a transmission duration 511 associated with the second secondary access category. Access point 101 may then transmit a multiple-TID block acknowledgement 512 which acknowledges the receipt of data associated with the secondary access categories.

Figure 6:
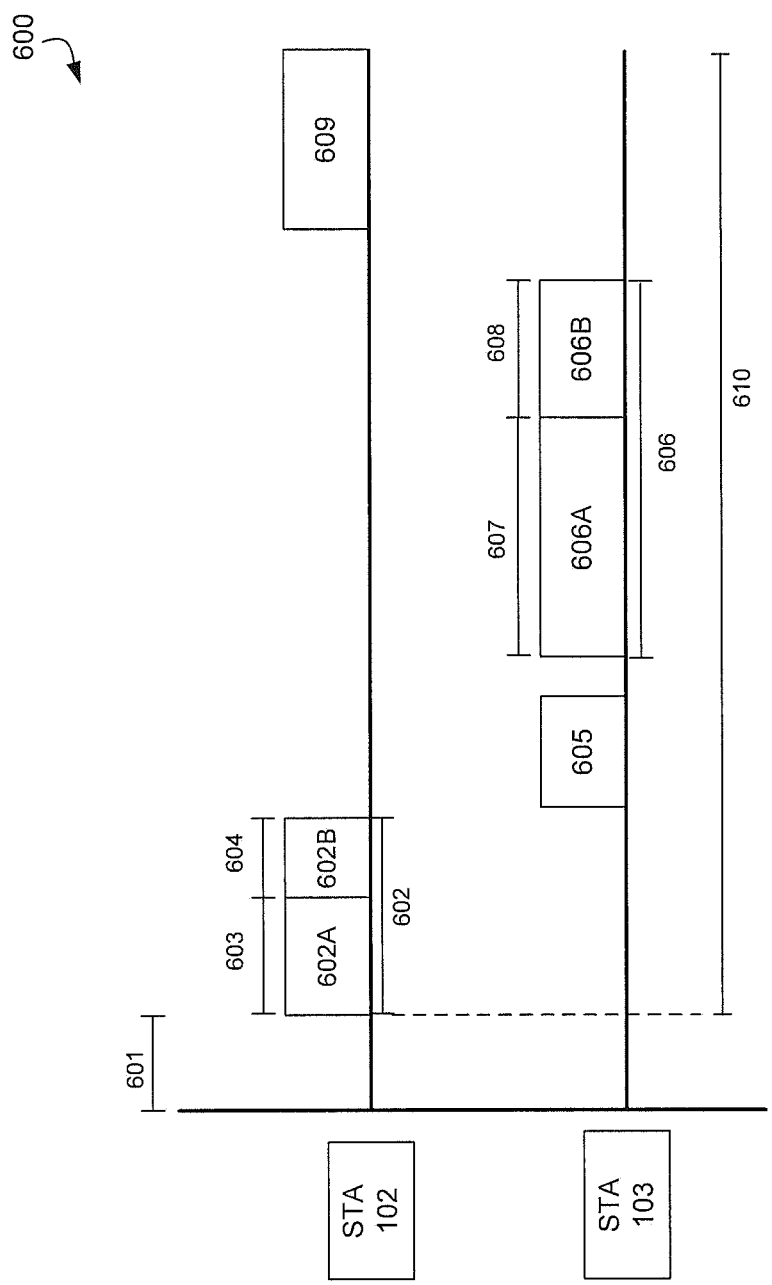
FIG. 6 is a transmission diagram illustrating example single-user multiple traffic identifier transmissions with reverse direction grant functionality, according to some embodiments.

FIG. 6 is a transmission diagram illustrating example single-user multiple traffic identifier transmissions with reverse direction grant (RDG) functionality between electronic device 102 ("STA 102") and electronic device 103 ("STA 103"), according to some embodiments. In some embodiments, an electronic device, such as electronic device 102, may enable RDG functionality for SU multiple-TID transmissions from reverse direction (RD) responders, e.g., electronic device 103. After a back-off period 601, electronic device 102 may enable RDG functions within system 100 by setting an appropriate configuration parameter. In some embodiments, when electronic device 102 obtains a TXOP 610, electronic device 102 may enable RDG functions by transmitting a data unit 602, such as a SU PPDU, and setting a RDG field within the PPDU to a predetermined value, e.g., "1." Data unit 602 may contain data associated with the primary access category 602A, such as an MPDU, and data associated with a secondary access category 602B, such as an MPDU. MPDU 602A may have a transmission duration 603 based on the primary access category. MPDU 602B may have a transmission duration 604 associated with a secondary access category. Electronic device 102 may be considered the TXOP holder (because it obtained the TXOP) as well as a RD initiator (because it initiates the RDG functions). As the TXOP holder, electronic device 102 may set TXOP 610 which is the remaining time that may be used by electronic device 103 to transmit its data.

Electronic device 103, which receives data unit 602, may respond with a multiple-TID BA 605 acknowledging receiving data unit 602. Electronic device 103 may transmit data unit 606, such as SU PPDU. Accordingly, electronic device 103 may be considered an RD responder. Data unit 606 may contain data associated with a first secondary access category 606A, such as an MPDU, and data associated with a second secondary access category 606B, such as an MPDU. MPDU 606A may have a transmission duration 607 based on the primary access category. MPDU 606B may have a transmission duration 608 associated with a secondary access category. In some embodiments, electronic device 103 may include a multiple-TID BA within data unit 606. Electronic device 102 may transmit a multiple-TID BA 609 in response to receiving data unit 606.

In some embodiments, after transmission by electronic device 102, electronic device 103 may utilize the remaining TXOP to transmit data units associated with the primary access category and then transmit any other data units associated with the secondary access categories. In some embodiments, electronic device 103 may transmit these data units based on applicable limits established by access point 101 consistent with any aggregation rules implemented for the TXOP.

Figure 7:
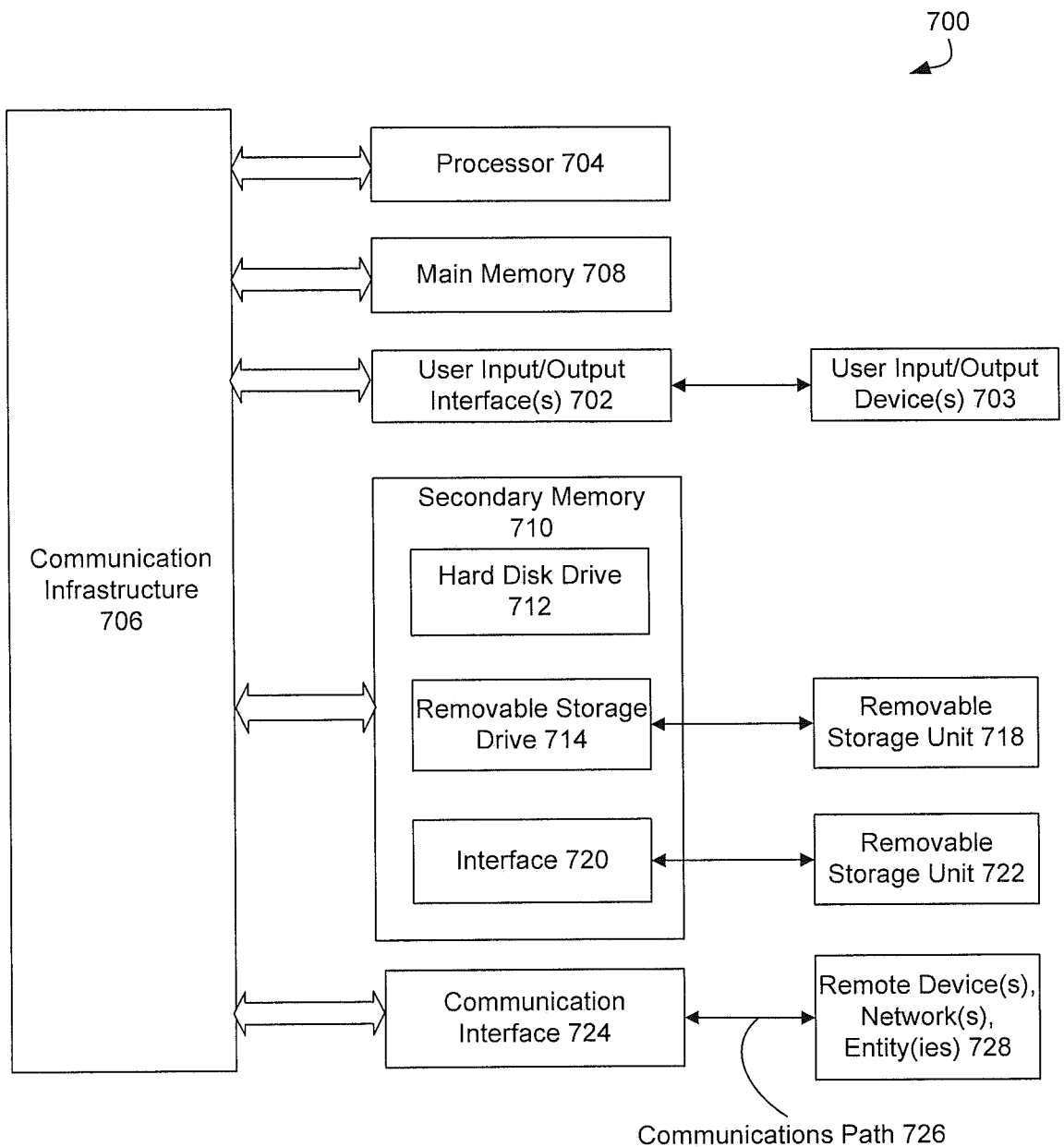
FIG. 7 is an example computer system for implementing various embodiments of the disclosure.

Various embodiments can be implemented, for example, using one or more computer systems, such as computer system 700 shown in FIG. 7. Computer system 700 can be used, for example, to implement method 200 of FIG. 2 and method 300 of FIG. 3. For example, computer system 700 can perform a process for transmitting a single-user aggregated frame having data with multiple traffic identifiers, according to some embodiments. Computer system 700 can be any computer capable of performing the functions described herein.

Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture including a tangible computer useable or readable medium having control logic (software) stored thereon is also referred to herein as a "computer program product" or "program storage device." This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   contending for a transmission opportunity to transmit first data associated with a first access category and second data associated with a second access category;
   receiving, from an access point, a configuration parameter, wherein the configuration parameter indicates that data associated with the first access category can be aggregated with data associated with the second access category;

associating the first data with a first traffic identifier based at least in part on the first access category having a first transmission priority;
associating the second data with a second traffic identifier based at least in part on the second access category having a second transmission priority;
obtaining the transmission opportunity based at least in part on the first access category;
forming, based on the configuration parameter, an aggregated data unit comprising the first data associated with the first access category having the first transmission priority and the second data associated with the second access category having the second transmission priority, wherein the aggregated data unit comprises a parameter indicating that the aggregated data unit is a single-user multiple traffic identifier data unit; and
transmitting, based at least in part on the configuration parameter, the aggregated data unit to the access point during the transmission opportunity, wherein the configuration parameter includes at least one of:
an indication of a first maximum transmission window for the first data;
an indication of a second maximum transmission window for the second data; or
an indication that single-user multiple traffic identifier transmissions are enabled.

2. The method of claim 1, further comprising:
classifying, based at least in part on the configuration parameter, the first access category as a primary access category; and
classifying, based at least in part on the configuration parameter, the second access category as a secondary access category.

3. The method of claim 2, wherein the configuration parameter includes at least one of:
an indication that the first access category is classified as the primary access category;
an indication that the second access category is classified as the primary access category;
an indication that the first access category is classified as the secondary access category; or
an indication that the second access category is classified as the secondary access category.

4. The method of claim 1, further comprising:
receiving, from the access point, a block acknowledgement in response to transmitting the aggregated data unit.

5. The method of claim 1, further comprising:
forming another aggregated data unit based at least in part on the first data, the second data, or third data, wherein the third data is associated with a third traffic identifier based at least in part on a third access category; and
transmitting the another aggregated data unit during the transmission opportunity.

6. A system comprising:
a processor; and
a memory operatively coupled to the processor, the memory configured to store program code that when executed causes the processor to perform operations comprising:
contending for a transmission opportunity to transmit first data associated with a first access category having a first transmission priority;
receiving, from an access point, a configuration parameter, wherein the configuration parameter indicates that data associated with the first access category can be aggregated with data associated with a second access category;
associating the first data with a traffic identifier based at least in part on the first access category;
obtaining the transmission opportunity based at least in part on the first access category;
forming, based on the configuration parameter, an aggregated data unit comprising the first data associated with the first access category having the first transmission priority and second data associated with the second access category having the second transmission priority, wherein the aggregated data unit comprises a parameter indicating that the aggregated data unit is a single-user multiple traffic identifier data unit; and
transmitting, based at least in part on the configuration parameter, the aggregated data unit to an access point during the transmission opportunity, wherein the configuration parameter includes at least one of:
an indication of a first maximum transmission window for the first data;
an indication of a second maximum transmission window for the second data; or
an indication that single-user multiple traffic identifier transmissions are enabled.

7. The system of claim 6, wherein forming the aggregated data unit further comprises selecting the first data and the second data based at least in part on an aggregation rule.

8. The system of claim 6, wherein the operations further comprise:
classifying, based at least in part on the configuration parameter, the first access category as a primary access category; and
classifying, based at least in part on the configuration parameter, the second access category as a secondary access category.

9. The system of claim 8, wherein the operations further comprise:
receiving the configuration parameter, wherein the configuration parameter includes at least one of:
an indication that the first access category is classified as the primary access category;
an indication that the second access category is classified as the primary access category;
an indication that the first access category is classified as the secondary access category; or
an indication that the second access category is classified as the secondary access category.

10. The system of claim 6, wherein the operations further comprise:
forming another aggregated data unit based at least in part on the first data, the second data, or third data, wherein the third data is associated with a third traffic identifier based at least in part on a third access category; and
transmitting the another aggregated data unit during the transmission opportunity.

11. A non-transitory computer-readable device having instructions stored thereon that, when executed by at least one computing device, causes the at least one computing device to perform operations comprising:
associating first data with a first traffic identifier based at least in part on a first access category having a first transmission priority;
associating second data with a second traffic identifier based at least in part on a second access category having a second transmission priority, wherein the second transmission priority is higher than the first transmission priority;

obtaining a transmission opportunity based at least in part on the first access category;

receiving, from an access point, a configuration parameter, wherein the configuration parameter indicates that data associated with the first access category can be aggregated with data associated with the second access category;

forming, based on the configuration parameter, an aggregated data unit comprising the first data associated with the first access category and the second data associated with the second access category having the second transmission priority;

determining, based at least in part on an aggregation rule, whether to send the aggregated data unit as a single-user multiple traffic identifier data unit;

in response to the determining to send the aggregated data unit as the single-user multiple traffic identifier data unit, adding a parameter to the aggregated data unit, wherein the parameter indicates that the aggregated data unit is the single-user multiple traffic identifier data unit; and transmitting the aggregated data unit based in least in part on the aggregation rule and the transmission opportunity.

12. The non-transitory computer-readable device of claim 11, wherein the operations further comprise:

classifying, based at least in part on the configuration parameter, the first access category as a primary access category; and classifying, based at least in part on the configuration parameter, the second access category as a secondary access category.

13. The non-transitory computer-readable device of claim 12, wherein the operations further comprise:

receiving the configuration parameter, wherein the configuration parameter includes at least one of:
   an indication that the first access category is classified as the primary access category;
   an indication that the second access category is classified as the primary access category;
   an indication that the first access category is classified as the secondary access category; or
   an indication that the second access category is classified as the secondary access category.

14. The non-transitory computer-readable device of claim 12, wherein the transmitting comprises transmitting the aggregated data unit based at least in part on the configuration parameter to an access point.

15. The non-transitory computer-readable device of claim 14, wherein the configuration parameter includes at least one of:
   an indication of a first transmission window for the first data;
   an indication of a second transmission window for the second data; or
   an indication that single-user multiple traffic identifier transmissions are enabled.

16. The non-transitory computer-readable device of claim 14, wherein the operations further comprise:

receiving, from the access point, a block acknowledgement in response to transmitting the aggregated data unit.

* * * * *

UNITED STATES PATENT AND TRADEMARK OFFICE
CERTIFICATE OF CORRECTION

PATENT NO. : 10,849,168 B2
APPLICATION NO. : 15/590866
DATED : November 24, 2020
INVENTOR(S) : Ashok Ranganath et al.

Page 1 of 1

It is certified that error appears in the above-identified patent and that said Letters Patent is hereby corrected as shown below:

On the Title Page

Item (73), Assignee, "Cupertine, CA" should read --Cupertino, CA--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*